(12) United States Patent
Kim et al.

(10) Patent No.: US 9,522,607 B2
(45) Date of Patent: Dec. 20, 2016

(54) SYSTEM AND CONTROL METHOD FOR RESERVED CHARGE OF BATTERY FOR VEHICLE

(71) Applicant: Hyundai Motor Company, Seoul (KR)

(72) Inventors: Woo Sung Kim, Gyeonggi-Do (KR); Kyung In Min, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 125 days.

(21) Appl. No.: 14/535,222

(22) Filed: Nov. 6, 2014

(65) Prior Publication Data

US 2015/0258909 A1 Sep. 17, 2015

(30) Foreign Application Priority Data

Mar. 14, 2014 (KR) .......................... 10-2014-0030014

(51) Int. Cl.
*B60L 11/18* (2006.01)
*B60H 1/00* (2006.01)

(52) U.S. Cl.
CPC ....... *B60L 11/1861* (2013.01); *B60H 1/00392* (2013.01); *B60H 1/00778* (2013.01); *B60L 11/1838* (2013.01); *Y02T 10/7005* (2013.01)

(58) Field of Classification Search
CPC ............. B60H 1/00392; B60H 1/00778; B60L 11/1838; B60L 11/1861; Y02T 10/7005; H02J 7/04; H02J 7/041
USPC ............................... 701/22, 36; 320/155, 157
See application file for complete search history.

(56) References Cited

U.S. PATENT DOCUMENTS

| 4,377,787 | A  | * | 3/1983  | Kikuoka | G01R 31/3613 324/426 |
| 6,484,833 | B1 | * | 11/2002 | Chhaya  | B60K 6/52 180/65.225 |
| 6,624,615 | B1 | * | 9/2003  | Park    | B60L 3/0046 320/150 |
| 8,624,719 | B2 | * | 1/2014  | Klose   | B60L 11/1838 340/425.5 |

(Continued)

FOREIGN PATENT DOCUMENTS

| JP | 11-275775 A | 10/1999 |
| JP | 2000-102104 | 4/2000 |

(Continued)

*Primary Examiner* — Calvin Cheung
*Assistant Examiner* — Angelina Shudy
(74) *Attorney, Agent, or Firm* — Mintz Levin Cohn Ferris Glovsky and Popeo, P.C.; Peter F. Corless

(57) ABSTRACT

A system and control method for reserved charge of a vehicle battery is provided. The method includes receiving, at a controller, a vehicle operation start time input and a reserved charge command via an input device and receiving information regarding an output state of a charger when the vehicle is connected to the charger. In addition, the controller calculates an estimated charging time consumed for charging the battery using the information on the output state of the charger and calculates a charge start time for completing the battery charge before a vehicle operation starts based on the vehicle operation start time and the estimated charging time. The vehicle is operated to be in a standby state before the charge until the charge start time is reached and the charge is adjusted to charge the battery with power input from the charger when the charge start time is reached.

20 Claims, 1 Drawing Sheet

(56) References Cited

U.S. PATENT DOCUMENTS

| | | | | |
|---|---|---|---|---|
| 8,810,198 B2* | 8/2014 | Nergaard | ................ | B60L 1/003 320/109 |
| 9,046,586 B2* | 6/2015 | Yuasa | ................ | G01R 31/3679 |
| 9,296,305 B2* | 3/2016 | Ichikawa | ............ | B60L 11/1838 |
| 2009/0223726 A1* | 9/2009 | Jeon, II | ................ | B60L 3/0046 180/65.25 |
| 2010/0188043 A1* | 7/2010 | Kelty | .................... | B60L 3/0046 320/109 |
| 2010/0217485 A1* | 8/2010 | Ichishi | ................ | B60L 11/1824 701/36 |
| 2011/0118919 A1* | 5/2011 | Park | .................... | B60H 1/00392 701/22 |
| 2011/0140659 A1* | 6/2011 | Suzuki | ................ | B60L 11/1824 320/109 |
| 2012/0086395 A1* | 4/2012 | Kim | .................... | B60L 11/1838 320/109 |
| 2012/0101659 A1* | 4/2012 | Kim | .................... | B60H 1/00257 701/2 |
| 2012/0293118 A1* | 11/2012 | Kim | ........................ | H02J 5/005 320/108 |
| 2013/0110428 A1* | 5/2013 | Sun | ....................... | G01R 31/362 702/63 |
| 2013/0179061 A1* | 7/2013 | Gadh | .................. | B60L 11/1842 701/123 |
| 2014/0021918 A1* | 1/2014 | Ichikawa | ............ | B60L 11/1838 320/109 |
| 2014/0125281 A1* | 5/2014 | Mitsutani | .............. | H01M 10/48 320/109 |
| 2014/0354289 A1* | 12/2014 | Kim | .................... | B60L 11/1861 324/426 |
| 2014/0375265 A1* | 12/2014 | Koyama | ............. | B60L 11/1816 320/109 |
| 2015/0006001 A1* | 1/2015 | Kawata | .................... | B60K 6/48 701/22 |
| 2015/0057957 A1* | 2/2015 | Kim | .................... | G01R 31/3679 702/63 |
| 2015/0180255 A1* | 6/2015 | Kim | ........................ | H02J 7/045 320/162 |
| 2015/0326050 A1* | 11/2015 | Baek | .................... | B60L 11/1816 320/137 |
| 2016/0069961 A1* | 3/2016 | Min | ...................... | G01R 31/362 324/426 |
| 2016/0084917 A1* | 3/2016 | Nam | .................... | G01R 31/3655 324/432 |
| 2016/0159238 A1* | 6/2016 | Min | .................... | B60L 11/1861 320/109 |
| 2016/0243956 A1* | 8/2016 | Yuan | .................... | B60L 11/1816 |

FOREIGN PATENT DOCUMENTS

| | | |
|---|---|---|
| JP | 2001016794 A * | 1/2001 |
| KR | 10-2010-0075392 | 7/2010 |
| KR | 10-2011-0043861 A | 4/2011 |
| KR | 10-2012-0099869 | 9/2012 |
| KR | 10-2012-0102464 | 9/2012 |
| KR | 10-2013-0049200 A | 5/2013 |
| KR | 10-2013-0102404 A | 9/2013 |

\* cited by examiner

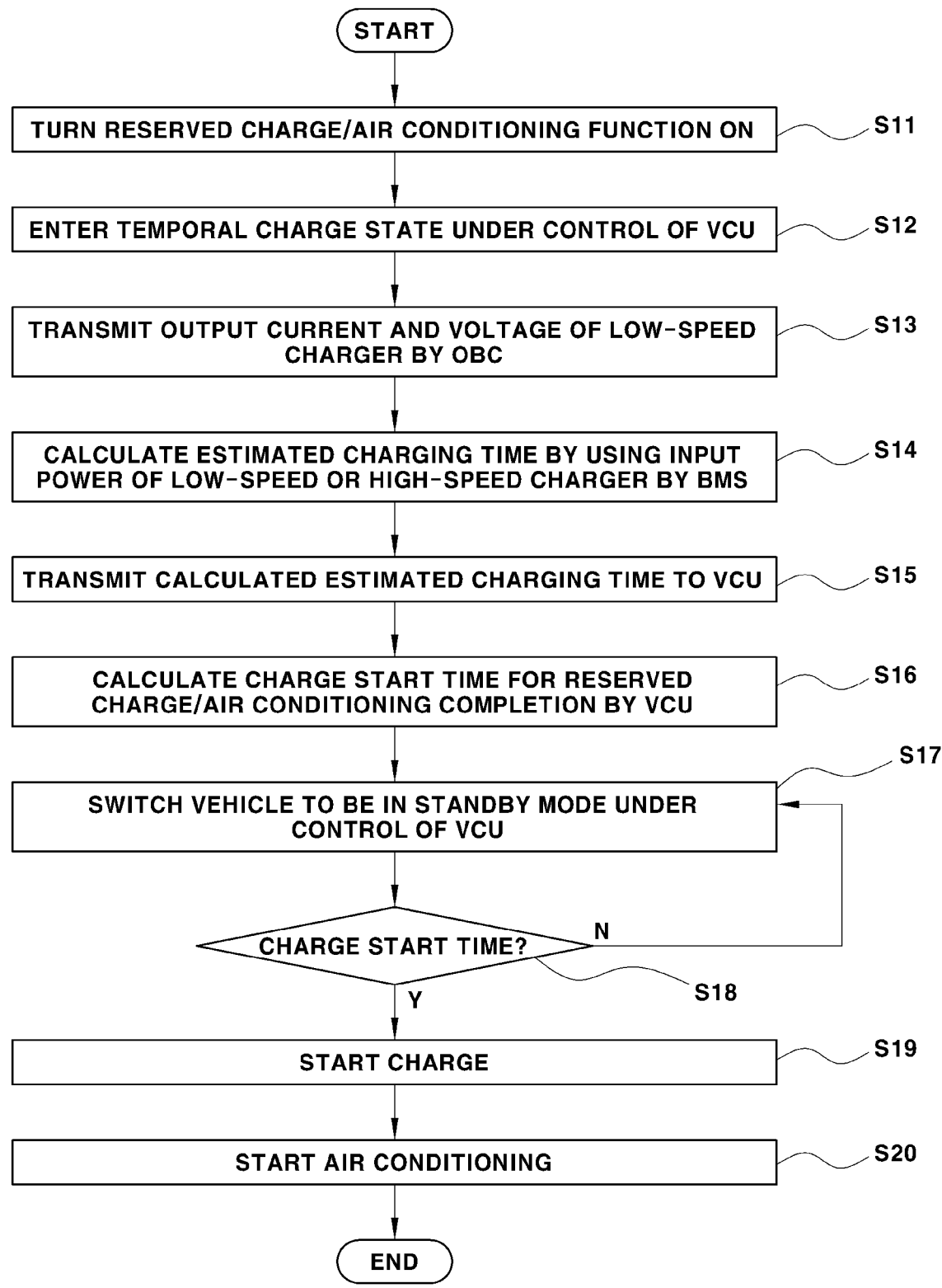

SYSTEM AND CONTROL METHOD FOR RESERVED CHARGE OF BATTERY FOR VEHICLE

CROSS-REFERENCE TO RELATED APPLICATION

This application claims under 35 U.S.C. §119(a) the benefit of Korean Patent Application No. 10-2014-0030014 filed on Mar. 14, 2014, the entire contents of which are incorporated herein by reference.

BACKGROUND (a) Technical Field

The present disclosure relates to a system and method of controlling charge of a battery for a vehicle. More particularly, the present invention relates to a system and control method for reserved charge of a vehicle battery, which may complete a charge of a battery in advance based on a vehicle operation time set by a driver.

(b) Background Art

Recently, developments have been made to supplying an environmentally-friendly vehicle globally, which uses an electric motor as a driving source of a vehicle, and to a technology of an electric energy storage device, such as a battery, which is a power source of the environmentally-friendly vehicle. Accordingly, research has been conducted regarding development of an internal/external device and charging equipment for a vehicle battery, expansion of a charge infrastructure, and the like.

As is well known, an environmentally-friendly vehicle, such as an electric vehicle or a hybrid vehicle, includes an electric motor as a driving source of the vehicle, a motor control unit (MCU, including an inverter) configured to drive and operate the electric motor, a battery configured to supply power for driving the electric motor, and a charging device within the vehicle configured to charge the battery, and includes a charging port for connection between the vehicle and an external charging device, and the like.

A battery management system (BMS) configured to monitor and manage a state and an operation of the battery is mounted within the environmentally-friendly vehicle, and collect battery state information, such as a voltage, a current, a temperature, a state of charge (SOC) and the like of a battery pack, and provide the collected battery state information to another controller inside and outside of the vehicle to use the collected battery state information to operate the vehicle or the charge. A battery of an environmentally-friendly vehicle, such as an electric vehicle (EV) and a plug-in hybrid electric vehicle (PHEV), may be charged at a substantially low speed by connecting an alternating current (AC) charging power source (e.g., low-speed charger) to the vehicle or charged at a substantially high speed by connecting a direct current (DC) charging power source (e.g., high-speed charger) to the vehicle.

When the low-speed charger supplies AC power to the vehicle, an on-board charger (OBC) within the vehicle converts AC power to DC power to charge the battery. In the meantime, the high-speed charger converts AC power to DC and supplies the DC to the vehicle, and is directly connected to the battery within the vehicle to supply a substantially high current, thereby completing the charge of the battery within a substantially short period of time. To charge the battery, a connector of an external charger (e.g., the low-speed charger or the high-speed charger) is connected to a charging port of the vehicle, and charging power of the charger may be supplied through the connection of the connector.

A plurality of terminals, such as a communication terminal, a communication power supply terminal, and a ground connection terminal for communication connection with the vehicle, are provided at the connector to supply charging power, in addition to a power supply terminal. When reserved charge, which may automatically complete charge of the battery in accordance with a desired vehicle operation start time when a driver connects the vehicle to the external charger, to charge the battery of the vehicle at a substantially low speed or a high speed after the operation of the vehicle, is performed, convenience of the user may be considerably improved.

However, to perform the reserved charge, there is a need to be aware of a time consumed for charging in the vehicle, and when all of specifications of the external charging power sources (the low-speed charger or the high-speed charger) are the same, and when a predetermined uniform current and voltage is output from the external charging power sources, a time consumed for charging may be more easily estimated.

However, the specifications of the power sources of the external chargers for charging the vehicle are may not be uniform, and even though the specifications of the power sources are the same, output states of a current, a voltage, and the like actually output from the charger may be different according to a system power supply connected with the charger. For example, even though the specifications of the power sources of two external chargers are the same with 100 kW, there may be a difference in a current and a voltage which may be output when the two external chargers charge the battery. An external charge power source (the low-speed or high-speed charger) in accordance with a design specification of the battery pack may be connected to the vehicle during the charge of the battery, but an external charging power source with a lower power supply system may also be connected with the vehicle.

As described above, the specifications and the output states, such as the output current and voltage, of the external charge power sources for charging the battery may be different, and a time consumed for charging of the battery may be different according to a specification or an output state of the connected power source. Since an estimation of a time consumed for charging may be difficult as described above, a reserved charge technology may be difficult to apply, which enables the battery to be accurately and completely charged at a time desired by a driver, to an environmentally-friendly vehicle, such as an electric vehicle or a hybrid vehicle.

When an air conditioning function, used to adjust an internal temperature of a vehicle in advance before a driver and a passenger enter the vehicle, is applied to an environmentally-friendly vehicle, in addition to the reserved charging function, it may be possible to maximize convenience of a user, but a reserved air conditioning technology associated with the reserved charge has not been suggested.

The above information disclosed in this section is merely for enhancement of understanding of the background of the invention and therefore it may contain information that does not form the prior art that is already known in this country to a person of ordinary skill in the art.

SUMMARY

The present invention provides a reserved charging method, which may confirm output information regarding a charger connected with a vehicle when a driver desires to reserve a battery charge, calculate a time consumed for charging, to which the output information regarding the charger is reflected, calculate a charge start time based on the time consumed for charging, and then initiate the charge of the battery from the calculated charge start time, thereby more accurately completing the charge of the battery in accordance with a vehicle operation time set by the driver. Another object of the present invention is to provide a method of improving user convenience by performing reserved air conditioning associated with reserved charge when a driver sets a reserved charge function and a reserved air conditioning function together.

In one aspect, the present invention provides a control method for reserved charge of a vehicle battery that may include: in response to a vehicle operation start time input and a reserved charge command through an input device, receiving information regarding an output state of a charger when the vehicle is connected to the charger; calculating an estimated charging time consumed for charging the battery using the information regarding the output state of the charger; calculating a charge start time for completing the charge of the battery before a vehicle operation starts based on the vehicle operation start time and the estimated charging time; operating the vehicle to be in a standby state before the charge until the charge start time is reached; and adjusting the charge so that the battery is charged with power input from the charger when the charge start time is reached in the standby state before the charges.

Furthermore, the information regarding the output state may be charging current and voltage values which the charger outputs. In addition, the information regarding the charging current and voltage values may be information received from the charger via communication with the charger, or information regarding sensed current and voltage values output from the charger to the vehicle by operating the vehicle to be in a temporal charge state while receiving the information regarding the output state of the charger.

The control method may further include: in response to an input for a reserved air conditioning command for adjusting an internal temperature of the vehicle before a start of the vehicle operation together with the reserved charge command through the input device, calculating the charge start time for starting the reserved charge of the battery based on the vehicle operation start time, the estimated charging time, an air conditioning time; and performing reserved air conditioning of operating an air conditioning device of the vehicle before the start of the vehicle operation after the completion of the charge of the battery.

The input device may be a vehicle terminal or a driver's portable terminal connected to the vehicle terminal and configured to transmit the estimated charging time calculated using the information regarding the output state of the charger for the reserved charge to display the estimated charging time on the vehicle terminal or the portable terminal. In addition, when the charger is a low-speed charger, the estimated charging time may be calculated by calculating an average current value that corresponds to an output voltage of the charger in the information regarding the output state of the charger from stored map data, and then using a maximum capacity of the battery, information regarding an initial SOC of the battery, the average current value, and the output voltage of the charger.

Moreover, when the charger is a high-speed charger, a time value that corresponds to an initial SOC of the battery, an initial temperature of the battery, and rated output power of the charger, which is information input from the charger, may be obtained from map data, and the time value obtained from the map data may be corrected using an actual output power value obtained by multiplying a charging current and a charging voltage, which the charger outputs, as the information regarding the output state to calculate the estimated charging time. The estimated charging time may be calculated by correcting the time value obtained from the map data by multiplying the time value and a weighted value, and the weighted value may be calculated based on a ratio value of the rated output power and the actual output power.

According to the exemplary embodiment of the present invention, the control method for reserved charge of a vehicle battery may confirm the output information regarding the charger connected to the vehicle, calculate the time consumed for charging, to which the output information regarding the charger is reflected, calculate the charge start time based on the time consumed for charging, and then perform the reserved charge using the calculated charge start time, thereby more accurately performing the reserved charge considering the state of the external charge power source, and more accurately completing the charge of the battery in accordance with the vehicle operation time desired by the driver.

In the present invention, when the driver sets the reserved air conditioning function together with the reserved charge function, the reserved air conditioning of automatically adjusting an internal temperature of the vehicle before the driver begins to operate the vehicle may be performed after the completion of the charging in association with the reserved charging, thereby considerably improving convenience of a user.

BRIEF DESCRIPTION OF THE DRAWINGS

The above and other features of the present invention will now be described in detail with reference to exemplary embodiments thereof illustrated by the accompanying drawings which are given hereinbelow by way of illustration only, and thus are not limitative of the present invention, and wherein:

FIG. 1 is an exemplary flowchart illustrating a process for reserved charge according to the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a reserved charging method, which confirms output information about a charger connected with a vehicle when a driver desires to reserve charge, calculates a time consumed for charging, to which the output information regarding the charger is reflected, calculates a charge start time considering the time consumed for charging, and then starts the charge of the battery from the calculated charge start time, thereby more accurately completing the charge of the battery in accordance with a vehicle operation time set by the driver. The present invention provides a method of improving convenience of a user by performing reserved air conditioning associated with reserved charge when a driver sets a reserved charge function and a reserved air conditioning function together.

FIG. 1 is an exemplary flowchart illustrating a process for reserved charge according to the present invention, and as illustrated in FIG. 1, when a driver desires to reserve (e.g., preserve) charge in a state where a vehicle is connected to an external charger after the driver completes a vehicle operation, the driver may input a reserved charge command using an input device. In particular, a vehicle terminal mounted within the vehicle or a driver's portable terminal connected to the vehicle terminal may be used as an input device, and the reserved charge command may be input by setting a reserved charge function on via the input device (S11).

Further, the driver may perform a setting and input process of turning (e.g., operating) the reserved charge function on by inputting, by the driver, a next time, at which the driver desires to start an operation of the vehicle, that is, a desired vehicle operation start time, via the vehicle terminal or a portable terminal.

The driver may input a reserved charge command and a reserved air conditioning command via the input device, and in this process, the driver may set the reserved air conditioning function on for automatically adjusting an internal temperature of the vehicle based on a time (that is, the vehicle operation start time) at which the driver begins to operate the vehicle after the completion of the charge. In particular, the external charger may be a low-speed charger or a high-speed charger which supplies power received from a system power supply to the vehicle for charging the battery of the vehicle.

The vehicle terminal may be a terminal, such as a telematics unit, mounted to the vehicle, but the vehicle terminal of the present invention is not limited to the telematics unit. The portable terminal may be a smart device, such as a smart phone, connectable with the vehicle terminal to directly communicate with the vehicle terminal wired or wirelessly, or a smart device configured to transceive information with the vehicle terminal via an external server. For example, when the reserved charge process and the reserved air conditioning process of the present invention are connected with the telematics service, the reserved charge function and the reserved air conditioning function may be set and input through transmission of information between the portable terminal of the driver, a server of an external telematics center connected with the portable terminal via a mobile communication network, and a vehicle telematics unit.

In the present invention, for the reserved charge, the driver may confirm a time consumed for charging (estimated charging time) calculated by reflecting a power specification and an output state of the external charger connected with the vehicle via the vehicle terminal or the portable terminal, and input and set the vehicle operation start time based on the confirmed time consumed for charging. Accordingly, when the time consumed for charging (e.g., estimated charging time) is calculated which will be described below, a BMS of the vehicle may be configured to transmit information regarding the calculated estimated charging time to display the information on the vehicle terminal, or transmit information on the calculated estimated charging time to the portable terminal via the vehicle terminal to display the information on the portable terminal.

When the driver desires to operate the vehicle when the vehicle has been connected to the external charger, for example, the driver desires to operate the vehicle the next day when the vehicle has been connected to the external charger the previous day, when the driver inputs the vehicle operation start time, the reserved charge function of completing charge of the battery of the vehicle prior to the vehicle operation start time before the driver reaches the vehicle on the next day may be performed. The vehicle terminal may be provided to transmit the information (e.g., including information input via the portable terminal) set and input by the driver for the reserved charge and the reserved air conditioning to the controller within the vehicle.

Further, when the driver sets and operates the reserved charge function and the reserved air conditioning function when the vehicle is connected with the external charger after the completion of the operation of the vehicle, a plurality of controllers within the vehicle, for example, the BMS, a charge controller of the OBC, and a vehicle control unit (VCU), necessary for the charge of the battery, may be temporarily operated to be in a charge mode (S12) according to the reserved charge command set and input by the driver.

In the charge mode state, the BMS may be configured to receive information regarding the external charger via the communication, and in this case, the information regarding the external charger may include output state information regarding the external charger, and the output state information regarding the external charger may be information on values of a current and a voltage which the external charger may output during the charge (S13). The information regarding the external charger may further include information regarding rated output, that is, a rated power value of a design specification of the charger, together with the output state information.

The BMS may further be configured to receive the output state information, that is, the information regarding the values of the current and the voltage, which the external charger may output, from the external charger via the communication. Otherwise, the VCU may be configured to operate the vehicle to be in a temporal charge state, to allow the VCU to receive power input from the external charger, that is, information regarding values of a sensed current and voltage, which the external charger outputs, from the charge controller of the OBC in the temporal charge state.

Accordingly, the BMS, which is the controller for operating a battery system of the vehicle, may be configured to calculate an estimated charging time (e.g., time consumed for charging) consumed until the charge of the battery is completed based on the received output state information regarding the external charger, that is, information regarding an output charging current and voltage (S14). In particular, the estimated charging time may be a time consumed from an initial SOC (SOC before the charge) of the battery to full charge of the battery based on an output current and voltage state of the external charger. When a desired target SOC to a next operation of the vehicle is input and set during the setting of the reserved charge function, the estimated charging time may be a time consumed for the charge of the battery to the target SOC.

A process of calculating the estimated charging time will be described. For example, when the external charger is the low-speed charger, the estimated low-speed charging time may be calculated by calculating, by the BMS, an average current value that corresponds to a voltage value (e.g., an output voltage of the low-speed charger) in output state information regarding the low-speed charger, and then using a maximum capacity of the battery, the information regarding the initial SOC (e.g., information about a current SOC before the charge) of the battery, the average current value, and information regarding an output voltage value of the low-speed charger. In particular, the average current value may be obtained from a map stored in the BMS, and the map may be data in which an average current value is defined according to a voltage value.

When the external charger is the high-speed charger, a high-speed estimated charging time may be calculated using rated output power of the high-speed charger, the initial SOC of the battery, an initial temperature of the battery, and an actual output power value obtained by multiplying the output current and the output voltage, which are the output state information, of the high-speed charger. In particular, a method of first calculating a time value when the battery is charged with a rated power value of the high-speed charger as a time value that corresponds to an initial SOC of the current battery and an initial temperature of the battery, and correcting the calculated time value using information regarding the actual output power value, to determine the corrected time value as a final high-speed estimated charging time may be used.

In this process, a map, in which a time value is defined according to rated output power, an initial SOC of the battery, and an initial temperature of the battery, may be used, and the final high-speed estimated charging time may be calculated by multiplying the time value obtained from the map by a weighted value for correction. Particularly, the weighted value may be a ratio value of the rated output power and actual output power, and for example, when the high-speed charger having a specification of about 100 kW may actually output power of about 80 kW (calculated by multiplying an actual output voltage and an output current of the charger) according to a state of the system power supply, a weighted value may be about 100/80=1.25. When the actual output fails to reach the rated output, an increased charging time may be considered that may be greater than the time obtained from the map, and thus the final high-speed estimated charging time may be calculated by multiplying the weighted value that corresponds to the ratio value of the rated output and the actual output.

As described above, in the present invention, the estimated charging time, to which the actual output state of the charge power source is reflected, may be calculated, and the reserved charge may be completed before the vehicle operation start time set by the driver considering the estimated charging time. Accordingly, when the estimated charging time is calculated, the BMS may be configured to transmit the calculated estimated charging time to the VCU which may be the higher controller (S15), and the VCU may be configured to calculate a charge start time for the reserved charge based on the vehicle operation start time set by the driver and the estimated charging time (S16).

The charge start time may be calculated based on a time, at which the reserved charge is completed, in accordance with the vehicle operation start time, and when the reserved air conditioning function is selected, the charge start time, to which an air conditioning time is reflected, may be calculated. In other words, a time value, which may be the sum of the estimated charging time and the air conditioning time, may be calculated as a time value consumed for the charge and the air conditioning, and a time, which may be before hours consumed for the charge and the air conditioning from the vehicle operation start time set and input by the driver, may be determined as the charge start time. Then, the VCU may be switched to be in a standby mode and may be configured to operate the vehicle to be in a standby state before the charge until the charge start time is reached (S17), and then, when the charge start time reaches, the battery of the vehicle may be charged by controlling communication and cooperation between the VCU, the BMS and the charge controller of the OBC within the vehicle, and the external charger (S18 and S19).

The processes of charging the battery and controlling the charge of the battery are a reserved charge process of automatically completing the charge of the battery before the vehicle operation start time set by the user (before the driver begins to drive the vehicle), and the reserved air conditioning function may be a function selectively used based on the weather. When the air conditioning function is not selected, the charge start time based on the estimated charging time may be calculated without considering the air conditioning time, to start the reserved charge in accordance with the charge start time after the standby state.

When the air conditioning function is selected together with the reserved charge function, the reserved air conditioning of adjusting an internal temperature of the vehicle before the driver begins to drive the vehicle (before the vehicle operation start time) may be performed when the reserved charge is completed (S20). In particular, an air conditioning device of the vehicle performing the air conditioning may include cooling and heating devices, such as a heater and an air conditioner, and in the present invention, the reserved air conditioning may be performed by operating the air conditioning device for a predetermined time after the reserved charge. In other words, an operation time of the air conditioning device, that is, the air conditioning time, may be pre-set to a predetermined time, and the reserved air conditioning of operating the air conditioning device for a predetermined time before the vehicle operation start time after the reserved charge is performed.

As described above, the present invention may confirm the output information regarding the charger connected to the vehicle, calculate the time consumed for charging, to which the output information regarding the charger is reflected, calculate the charge start time considering the time consumed for charging, and then perform the reserved charge using the calculated charge start time, thereby more accurately performing the reserved charge considering the state of the external charge power source, and more accurately completing the charge of the battery in accordance with the vehicle operation time desired by the driver.

In the present invention, when the driver sets reservation air conditioning function together with the reservation charge function, the reserved air conditioning of automatically adjusting an internal temperature of the vehicle before the driver begins to operate the vehicle may be performed after the completion of the charging in association with the reserved charging, thereby considerably improving user convenience.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A control method for a reserved charge of a battery for a vehicle, comprising:
   receiving a vehicle operation start time and a reserved charge command input when a reserved charge function is turned on via an input device to completely charge the battery prior to the vehicle operation start time;
   receiving, at a controller, information regarding an output state of a charger when the vehicle is connected to the charger in response to receiving the vehicle operation start time and the reserved charge command;
   calculating, by the controller, an estimated charging time consumed for charging the battery using the information regarding the output state of the charger;
   calculating, by the controller, a charge start time for completing the charging of the battery before a vehicle operation starts based on the vehicle operation start time and the estimated charging time;
   operating, by the controller, the vehicle to be in a standby state before the charging until the charge start time reaches; and
   adjusting, by the controller, the charging to charge the battery with power input from the charger when the charge start time is reached in the standby state.

2. The control method of claim 1, wherein the information regarding the output state is charging current and voltage values output by the charger.

3. The control method of claim 2, wherein information regarding the charging current and voltage values is received from the charger via communication with the charger, or information regarding sensed current and voltage values actually output from the charger to the vehicle by operating the vehicle to be in a temporal charge state while receiving the information regarding the output state of the charger.

4. The control method of claim 1, comprising:
   in response to receiving an input of a reserved air conditioning command for adjusting an internal temperature of the vehicle before a start of the vehicle operation together with the reserved charge command via the input device, calculating, by the controller, the charge start time for starting the reserved charge of the battery based on the vehicle operation start time, the estimated charging time, an air conditioning time; and
   performing, by the controller, reserved air conditioning of operating an air conditioning device of the vehicle before the start of the vehicle operation after completion of the charging of the battery.

5. The control method of claim 1, wherein the input device is a vehicle terminal or a portable terminal connected to the vehicle terminal, and is configured to transmit the estimated charging time calculated using the information regarding the output state of the charger for the reserved charge to display the estimated charging time on the vehicle terminal or the portable terminal.

6. The control method of claim 1, wherein when the charger is a low-speed charger, the estimated charging time is calculated by calculating an average current value that corresponds to an output voltage of the charger in the information regarding the output state of the charger from map data, and then using a maximum capacity of the battery, information regarding an initial SOC of the battery, the average current value, and the output voltage of the charger.

7. The control method of claim 1, wherein when the charger is a high-speed charger, a time value that corresponds to an initial SOC of the battery, an initial temperature of the battery, and rated output power of the charger, which is information input from the charger, is obtained from map data, and the time value obtained from the map data is corrected using an actual output power value obtained by multiplying a charging current and a charging voltage, output by the charger, as the information regarding the output state to calculate the estimated charging time.

8. The control method of claim 7, wherein the estimated charging time is calculated by correcting the time value obtained from the map data by multiplying the time value and a weighted value, and the weighted value is calculated based on a ratio value of the rated output power and the actual output power.

9. A control system for reserved charge of a battery for a vehicle, comprising:
  a memory configured to store program instructions; and
  a processor configured to execute the program instructions, the program instructions when executed configured to:
    receive a vehicle operation start time and a reserved charge command input when a reserved charge function is turned on via an input device to completely charge the battery prior to the vehicle operation start time;
    receive information regarding an output state of a charger when the vehicle is connected to the charger in response to receiving the vehicle operation start time and the reserved charge command;
    calculate an estimated charging time consumed for charging the battery using the information regarding the output state of the charger;
    calculate a charge start time for completing the charging of the battery before a vehicle operation starts based on the vehicle operation start time and the estimated charging time;
    operate the vehicle to be in a standby state before the charging until the charge start time reaches; and
    adjust the charging to charge the battery with power input from the charger when the charge start time is reached in the standby state.

10. The system of claim 9, wherein the information regarding the output state is charging current and voltage values output by the charger.

11. The system of claim 10, wherein information regarding the charging current and voltage values is information received from the charger via communication with the charger, or information regarding sensed current and voltage values actually output from the charger to the vehicle by operating the vehicle to be in a temporal charge state while receiving the information regarding the output state of the charger.

12. The system of claim 9, wherein the program instructions when executed are further configured to:
  calculate the charge start time for starting the reserved charge of the battery based on the vehicle operation start time, the estimated charging time, an air conditioning time in response to receiving an input of a reserved air conditioning command for adjusting an internal temperature of the vehicle before a start of the vehicle operation together with the reserved charge command via the input device; and
  perform reserved air conditioning of operating an air conditioning device of the vehicle before the start of the vehicle operation after completion of the charging of the battery.

13. The system of claim 9, wherein the input device is a vehicle terminal or a portable terminal connected to the vehicle terminal, and is configured to transmit the estimated charging time calculated using the information regarding the output state of the charger for the reserved charge to display the estimated charging time on the vehicle terminal or the portable terminal.

14. The system of claim 9, wherein when the charger is a low-speed charger, the estimated charging time is calculated by calculating an average current value that corresponds to an output voltage of the charger in the information regarding the output state of the charger from map data, and then using a maximum capacity of the battery, information regarding an initial SOC of the battery, the average current value, and the output voltage of the charger.

15. The system of claim 9, wherein when the charger is a high-speed charger, a time value that corresponds to an initial SOC of the battery, an initial temperature of the battery, and rated output power of the charger, which is information input from the charger, is obtained from map data, and the time value obtained from the map data is corrected using an actual output power value obtained by multiplying a charging current and a charging voltage, output by the charger, as the information regarding the output state to calculate the estimated charging time.

16. A non-transitory computer readable medium containing program instructions executed by a controller, the computer readable medium comprising:
  program instructions that receive a vehicle operation start time and a reserved charge command input when a reserved charge function is turned on via an input device to completely charge the battery prior to the vehicle operation start time;
  program instructions that receive information regarding an output state of a charger when the vehicle is connected to the charger in response to receiving the vehicle operation start time and the reserved charge command;
  program instructions that calculate an estimated charging time consumed for charging the battery using the information regarding the output state of the charger;
  program instructions that calculate a charge start time for completing the charging of the battery before a vehicle operation starts based on the vehicle operation start time and the estimated charging time;
  program instructions that operate the vehicle to be in a standby state before the charging until the charge start time reaches; and
  program instructions that adjust the charging to charge the battery with power input from the charger when the charge start time is reached in the standby state.

17. The non-transitory computer readable medium of claim 16, wherein the information regarding the output state is charging current and voltage values output by the charger.

18. The non-transitory computer readable medium of claim 17, wherein information regarding the charging current and voltage values is information received from the charger via communication with the charger, or information regarding sensed current and voltage values actually output from the charger to the vehicle by operating the vehicle to be in a temporal charge state while receiving the information regarding the output state of the charger.

19. The non-transitory computer readable medium of claim 16, further comprising:
  program instructions that calculate the charge start time for starting the reserved charge of the battery based on the vehicle operation start time, the estimated charging time, an air conditioning time in response to receiving an input of a reserved air conditioning command for adjusting an internal temperature of the vehicle before a start of the vehicle operation together with the reserved charge command via the input device; and
  program instructions that perform reserved air conditioning of operating an air conditioning device of the vehicle before the start of the vehicle operation after completion of the charging of the battery.

20. The non-transitory computer readable medium of claim 16, wherein the input device is a vehicle terminal or a portable terminal connected to the vehicle terminal, and is configured to transmit the estimated charging time calculated using the information regarding the output state of the charger for the reserved charge to display the estimated charging time on the vehicle terminal or the portable terminal.

* * * * *